US009660452B2

(12) United States Patent
Routimo

(10) Patent No.: US 9,660,452 B2
(45) Date of Patent: May 23, 2017

(54) METHOD AND APPARATUS FOR CONTROLLING ELECTRIC GRID IN ISLANDING MODE

(75) Inventor: Mikko Routimo, Espoo (FI)

(73) Assignee: ABB Oy, Helsinki (FI)

(*) Notice: Subject to any disclaimer, the term of this patent is extended or adjusted under 35 U.S.C. 154(b) by 1413 days.

(21) Appl. No.: 13/469,868

(22) Filed: May 11, 2012

(65) Prior Publication Data
US 2012/0287683 A1  Nov. 15, 2012

(30) Foreign Application Priority Data

May 12, 2011 (EP) .................................. 11165784

(51) Int. Cl.
H02J 3/12 (2006.01)
H02J 3/38 (2006.01)
H02M 7/42 (2006.01)
H02J 3/18 (2006.01)

(52) U.S. Cl.
CPC ........ *H02J 3/38* (2013.01); *H02J 3/12* (2013.01); *H02J 3/1892* (2013.01); *H02J 2003/388* (2013.01); *H02M 7/42* (2013.01)

(58) Field of Classification Search
CPC .... H02J 3/12; H02J 3/1892; H02J 3/38; H02J 2003/388; H02M 7/42
USPC ...................................... 363/39–48
See application file for complete search history.

(56) References Cited

U.S. PATENT DOCUMENTS

| 4,780,650 | A | * | 10/1988 | Miyazaki | ................. | H02P 5/46 |
| | | | | | | 318/112 |
| 5,115,386 | A | * | 5/1992 | Shirahama | ........ | H02M 7/53871 |
| | | | | | | 307/66 |
| 5,355,025 | A | | 10/1994 | Moran et al. | | |
| 5,731,965 | A | * | 3/1998 | Cheng | ...................... | H02J 3/01 |
| | | | | | | 307/105 |

(Continued)

FOREIGN PATENT DOCUMENTS

WO    WO 94/10744    5/1994

OTHER PUBLICATIONS

European Search Report issued on Dec. 28, 2011, for European Application No. 11165784.7.
Rokrok et al., Adaptive voltage droop scheme for voltage source converters in an islanded multibus microgrid, IET Gener. Transm. Distrib., 2010, vol. 4, Iss. 5, pp. 562-578.
(Continued)

*Primary Examiner* — Timothy J Dole
*Assistant Examiner* — Ivan Laboy Andino
(74) *Attorney, Agent, or Firm* — Taft Stettinius & Hollister LLP

(57) ABSTRACT

An exemplary method for controlling transfer of electrical power in island mode in an arrangement having a converter and a load connected to the converter through a filter. The method including determining voltage reference components for one or more frequency components of an output voltage of the converter. An effect of a load current is compensated for by forming one or more voltage feedforward terms based on the load current and using the feedforward terms to adjust the voltage reference components. Control reference components for one or more of the frequency components are formed based on the voltage reference components, and a control reference is formed based on the control reference components. The output voltage of the converter is controlled based on the control reference.

13 Claims, 3 Drawing Sheets

(56) References Cited

U.S. PATENT DOCUMENTS

| | | | | |
|---|---|---|---|---|
| 5,883,796 | A * | 3/1999 | Cheng | H02J 3/1814 307/105 |
| 5,909,366 | A * | 6/1999 | Sanada | H02M 7/53875 363/17 |
| 6,977,827 | B2 * | 12/2005 | Gritter | H02M 7/53871 323/207 |
| 2005/0135031 | A1 | 6/2005 | Colby et al. | |
| 2006/0004531 | A1 * | 1/2006 | Ye | G01R 19/2513 702/60 |
| 2006/0256586 | A1 | 11/2006 | Ohshima et al. | |
| 2008/0211464 | A1 * | 9/2008 | Ponnaluri | H02M 7/493 323/207 |
| 2010/0302825 | A1 * | 12/2010 | Ohshima | H02M 7/5395 363/131 |
| 2012/0212191 | A1 * | 8/2012 | Yuzurihara | H02M 3/1584 323/205 |
| 2014/0091622 | A1 * | 4/2014 | Lucas | H02P 6/165 307/19 |
| 2015/0318705 | A1 * | 11/2015 | Lucas | H02J 3/381 307/129 |

OTHER PUBLICATIONS

Fang Z. Peng et al., Control and Protection of Power Electronics Interfaced Distributed Generation Systems in a Customer-Driven Microgrid, Power & Energy Society General Meeting, 2009, Pes '09, IEEE, Piscataway, NJ, USA, Jul. 26, 2009, pp. 1-8.

Jinwei He et al., Opportunities for Power Quality Improvement through DG-Grid Interfacing Converters, 2010 International Power Electronics Conference: Piscataway, NJ, USA, Jun. 21, 2010, pp. 1657-1664.

Amirnaser Yasdani, Control of an Islanded Distributed Energy Resource Unit with Load Compensating Feed-Forward, Power and Energy Society General Meeting—Conversion and Delivery of Electrical Energy in the 21st Century, Piscataway, NJ, USA, Jul. 20, 2008, pp. 1-7.

Prajna Paramita Dash et al., Study of Islanding Behavior of a Grid-Connected Photovoltaic System Equipped with a Feed-Forward Control Scheme, IECON 2010—36$^{th}$ Annual Conference on IEEE Industrial Electronics Society, IEEE, Piscataway, NJ, USA, Nov. 7, 2010, pp. 3228-3234.

* cited by examiner

METHOD AND APPARATUS FOR CONTROLLING ELECTRIC GRID IN ISLANDING MODE

RELATED APPLICATION

This application claims priority under 35 U.S.C. §119 to European Patent Application No. 11165784.7 filed in Europe on May 12, 2011, the entire content of which is hereby incorporated by reference in its entirety.

FIELD

The present disclosure relates to controlling a grid in islanding mode by using a frequency converter, compensating for harmonics and unbalance of grid voltage, and protecting the converter against over-current.

BACKGROUND INFORMATION

An islanding mode refers to a state of a power grid in which a part of the grid is separated from the rest of the grid. The separated part of the grid may be powered by means different from those empowering the rest of the grid.

An ability to operate in island mode is useful in utilization of e.g. distributed power production. It enables utilization of electric power in areas where no public power transmission lines are accessible, but sources of electrical energy (e.g. small-scale hydro, wind, or solar power) are available. Island mode operation also enables power to be supplied to a part of the grid during a grid fault.

Known island converter control systems can control an island grid voltage through a direct control loop, for example, by acting on the converter flux or voltage. FIG. 1 illustrates an example of an island converter control system in accordance with a known implementation. A converter 11 is connected to a grid 12. The grid voltage $u_l$ is measured, and the magnitude $|u_l|$ of the voltage is determined. A controller 13 then uses the magnitude $|u_l|$, together with a magnitude reference $|u_l^*|$, to calculate a value for a control reference. The control reference is used as an input for a control means 14. The control means 14 then controls an inverter bridge of the converter to produce a voltage vector on the basis of the control reference.

The controller 13 may, for instance, be a PI controller, as in FIG. 1. The control means may control the inverter bridge using, for instance, a PWM method or a DTC method. If a PWM-based approach is used, the controller 13 may produce a voltage vector magnitude reference. If a DTC-based approach is used, as in FIG. 1, a flux magnitude reference $|\psi_c^*|$ may be used to represent the control reference. In both approaches, the control means 14 may also use an angular frequency reference $\omega_c^*$ as an input.

A drawback of the control system presented in FIG. 1 is that a phase alignment angle of a voltage vector seen by the load cannot be controlled by the control system. At the same time, the load voltage vector is affected by the loading. Harmonic currents of non-linear loads may cause harmonic distortions to the output voltage. These currents may be difficult to compensate for. It may, however, be important to compensate for harmonic components of the output voltage of an island converter since a filter, and possibly a transformer, at the output of the island converter may cause the island grid to have a relatively large impedance. Under these conditions, it may be quite difficult to improve the quality of the voltages seen by the load.

SUMMARY

An exemplary method for controlling transfer of electrical power in island mode in an arrangement including a converter and a load connected to the converter is disclosed, the method comprising: determining voltage reference components for one or more frequency components of an output voltage of the converter, wherein the frequency components represent at least one of a positive sequence component, a negative sequence component, or harmonic components; compensating for an effect of a load current by forming one or more voltage feedforward terms based on the load current and using the feedforward terms to adjust the voltage reference components; forming control reference components for one or more of the frequency components based on the voltage reference components; forming a control reference based on the control reference components; and controlling the output voltage of the converter based on the control reference.

An exemplary apparatus for controlling transfer of electrical power in island mode in an arrangement including a converter and a load connected to the converter through a filter is disclosed, the apparatus comprising: means for determining voltage reference components for one or more frequency components of an output voltage of the converter, wherein the frequency components represent components such as a positive sequence component, a negative sequence component or harmonic components; means for compensating for an effect of a load current by forming one or more voltage feedforward terms based on the load current and using the feedforward terms to adjust the voltage reference components; means for forming control reference components for one or more of the frequency components based on the voltage reference components; means for forming a control reference based on the control reference components; and means for controlling the output voltage of the converter based on the control reference.

An exemplary computer-readable medium storing computer-readable instructions for a method of controlling transfer of electrical power in island mode in an arrangement including a converter and a load connected to the converter through a filter is disclosed, which when in communicable contact with a processor causes the processor to execute the method comprising: determining voltage reference components for one or more frequency components of an output voltage of the converter, wherein the frequency components represent at least one of a positive sequence component, a negative sequence component, or harmonic components; compensating for an effect of a load current by forming one or more voltage feedforward terms based on the load current and using the feedforward terms to adjust the voltage reference components; forming control reference components for one or more of the frequency components based on the voltage reference components; forming a control reference based on the control reference components; and controlling the output voltage of the converter based on the control reference.

BRIEF DESCRIPTION OF THE DRAWINGS

In the following, the exemplary method and apparatus of the disclosure will be described in greater detail by means of preferred embodiments and with reference to the attached drawings, in which.

DETAILED DESCRIPTION

Exemplary embodiments of the present disclosure provide a method and an apparatus for implementing the method so as to alleviate the above disadvantages.

An exemplary method and apparatus utilize an idea of controlling one or more frequency components of an output voltage of a converter. The frequency components may, for instance, be positive and negative sequence harmonic components of the output voltage. The frequency components may be used to form a control reference, and the control reference may then be used to control the converter. The control reference may be formed such that it contains no dc term in a stationary reference frame.

Using the exemplary methods and apparatuses of the present disclosure can improve control characteristics and to increase a degree of freedom in the control. The disclosed methods and apparatus enable not only control of the magnitude of the load voltage vector but also control of an alignment angle of the voltage vector. The unbalanced and harmonic voltages can also be easier to control.

Figure 1:
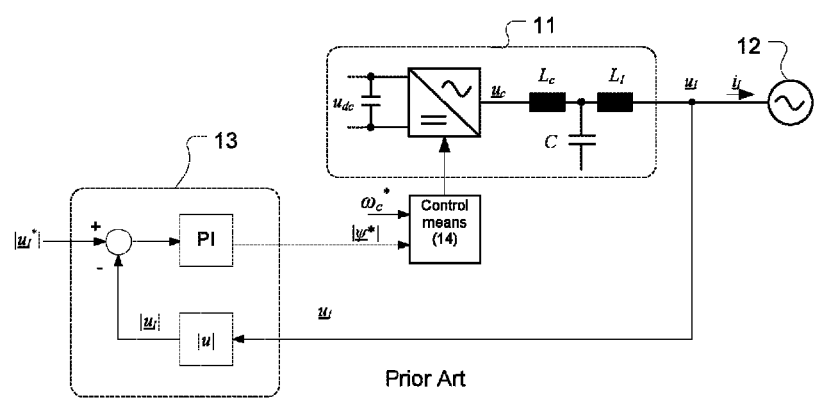
FIG. 1 illustrates an example of an island converter control system in accordance with a known implementation.
Figure 2:
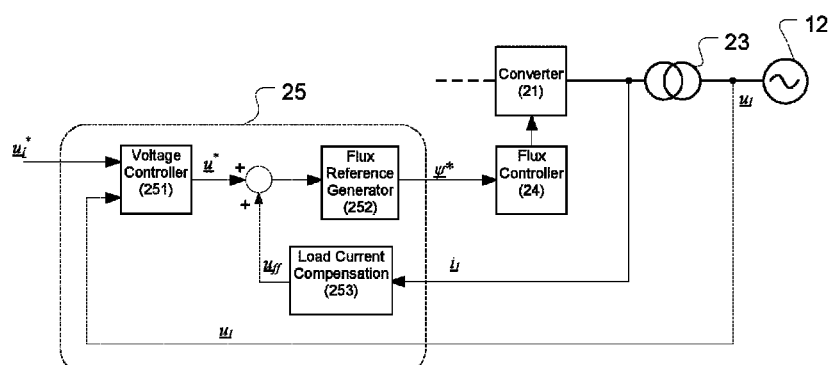
FIG. 2 illustrates a method for controlling transfer of electrical power of an arrangement capable of operating in an island grid in accordance with an exemplary embodiment of the present disclosure.

FIG. 2 illustrates a method for controlling transfer of electrical power of an arrangement capable of operating in an island grid in accordance with an exemplary embodiment of the present disclosure. FIG. 2 shows a method for controlling transfer of electrical power in islanding mode in an arrangement comprising an converter 21 and a load 22 connected to the converter 21. A transformer 23 may be placed between the converter 21 and the load 22. The converter 21 is controlled by a controller 24. A control system 25 of the method provides the controller 24 with a control reference.

In order to determine the control reference, voltage reference components for one or more frequency components of an output voltage of the converter are determined in the disclosed method. The frequency components may represent components such as positive and negative sequence components.

From a control point of view, the system to be controlled can be represented with rotating frame variables. Instead of controlling sinusoidal quantities in a stationary frame, dc quantities can be used. Therefore, the voltage reference components may be determined in rotating reference frames. Each component may operate in its own reference frame. A fundamental frequency component may, for instance, be defined in a synchronous reference frame. The term "synchronous reference frame" refers to a rotating reference frame which has an angular frequency equal to a fundamental frequency of the load voltage.

Although rotating reference frames can be useful exemplary methods of the present disclosure are not limited to rotating reference frames. For instance, a stationary reference frame may be used instead.

The voltage reference components may, for instance, be determined by using a controller for each component. In FIG. 2, a control loop for a single component is illustrated. A load voltage reference $u_l^*$ and a load voltage $u_l$ are first determined. In FIG. 2, they are determined in a rotating reference frame. The rotating reference frame may, for instance, be synchronous with the fundamental frequency. A voltage reference $u^*$ in the rotating reference frame is then determined on the basis of a difference between the load voltage reference $u^{l*}$ and the load voltage $u_l$. In FIG. 2, this is performed using a voltage controller 251. The controller 251 may, for instance, be a PI controller. Similar controllers may be formed for other voltage reference components. A control object for the control system 25 may, for instance, be that the converter produces such a voltage that the load voltage $u_l$ matches the load voltage reference $u_l^*$.

When the voltage reference components have been determined, control reference components for one or more frequency components of an output voltage of the converter may be formed on the basis of the voltage reference components. The frequency components may, for instance, be a positive and a negative sequence harmonic component of the output voltage. Each control reference component may operate in a reference frame of its own.

Finally, a control reference may then be formed on the basis of the control reference components, and the output voltage of the converter may then be controlled on the basis of the control reference. The controller controlling the converter may, for instance, be a voltage controller or a flux controller.

If a voltage controller is used, the controller may control the converter on the basis of voltage reference components. That is, the control reference is represented by a voltage. The voltage controller may, for instance, be a PWM (Pulse Width Modulation) based controller.

If a flux controller is used, the control reference components may be represented by one or more flux reference components which are formed on the basis of the voltage reference components. The control reference may be represented by a flux reference, which is formed on the basis of the flux reference components.

The flux controller may, for instance, be based on a DTC modulation scheme. DTC may be used in a so called scalar mode. That is, the magnitude of the flux vector is controlled in a manner similar to that used in connection with normal DTC, but torque control is based on a cross-product of a flux vector reference and an actual flux vector. The flux vector reference may be calculated so that the angular frequency of the actual flux vector is equal to the angular frequency reference.

In FIG. 2, the controller 24 is a flux controller using a flux reference $\psi^*$ as an input. The control system 25 provides the flux reference $\psi^*$. In FIG. 2, a flux reference generator 252 is used to determine the flux reference $\psi^*$. The flux controller 24 is used to control, on the basis of the flux reference $\psi^*$, the output voltage of the converter 21. The voltages produced by the converter 21 are thus controlled indirectly by using a flux reference $\psi^*$.

The flux reference $\psi^*$ can be seen as a virtual flux produced by the converter. The virtual flux $\psi_c$ is a time integral of a converter produced voltage vector $u_c$:

$$\psi_c = \int u_c dt + C, \quad (1)$$

where C is a constant. In other words, the flux may contain a dc term. Conversely, the voltage is a derivative of the virtual flux. However, a derivate of a constant is zero, and therefore, a voltage produced from a flux contains no dc term:

$$u_c = \frac{d}{dt}\psi_c. \quad (2)$$

If a flux controller is used to directly control a converter voltage, a dc term in the flux reference may cause numerical overflows or clipping in the calculation of references for modulation. Therefore, a dc term can be prevented from arising in the flux reference components.

In generic terms, Equation 2 can be written in a rotating reference frame rotating at a constant angular frequency $\omega_n$ as follows:

$$\underline{u}_c^n = j\omega_n \underline{\psi}_c^n + \frac{d}{dt}\underline{\psi}_c^n, \quad (3)$$

where superscript n refers to a reference frame rotating at the angular frequency $\omega_n$. More specifically, Equation 2 can be written in a synchronous reference frame rotating at a fundamental frequency $\omega$ as follows:

$$\underline{u}_c^s = j\omega \underline{\psi}_c^s + \frac{d}{dt}\underline{\psi}_c^s, \quad (4)$$

where superscript s refers to a synchronous reference frame rotating at a fundamental frequency $\omega$. Similarly, for components at frequencies $\omega_n = n\omega$, Equation 4 may be expressed as follows:

$$\underline{u}_c^n = jn\omega \underline{\psi}_c^n + \frac{d}{dt}\underline{\psi}_c^n, \quad (5)$$

where n is an integer. Positive values of n represent positive sequence components. Negative values of n represent negative sequence components. In a component form this can be written as:

$$u_{cd}^n = \frac{d}{dt}\psi_{cd}^n - n\omega\psi_{cq}^n, \quad (6a)$$

$$u_{cq}^n = n\omega\psi_{cd}^n + \frac{d}{dt}\psi_{cq}^n, \quad (6b)$$

where $u_{cd}^n$ is a voltage direct axis component, $u_{cq}^n$ is a voltage quadrature axis component, $\psi_{cd}^n$ is a virtual flux direct axis component, and $\psi_{cq}^n$ is a virtual flux quadrature axis component.

On the basis of Equations 6a and 6b, the following Laplace transformations may be formed:

$$U_{cd}^n(s) = s\Psi_{cd}^n(s) - n\omega\Psi_{cq}^n(s), \quad (7a)$$

$$U_{cq}^n(s) = n\omega\Psi_{cd}^n(s) + s\Psi_{cq}^n(s). \quad (7b)$$

Equations 7a and 7b may then be used to express virtual flux components as functions of voltage direct and quadrature axis components:

$$\Psi_{cd}^n(s) = \frac{s}{s^2 + (n\omega)^2}U_{cd}^n(s) + \frac{n\omega}{s^2 + (n\omega)^2}U_{cq}^n(s), \quad (8a)$$

$$\Psi_{cq}^n(s) = \frac{-n\omega}{s^2 + (n\omega)^2}U_{cd}^n(s) + \frac{s}{s^2 + (n\omega)^2}U_{cq}^n(s), \quad (8b)$$

where $\Psi_{cd}^n$ and $\Psi_{cq}^n$ are direct and quadrature axis virtual flux components in a reference frame rotating at the angular frequency $n\omega$, and $U_{cd}^n$ and $U_{cq}^n$ are direct and quadrature axis voltage components in the same rotating reference frame.

If a control system is designed to determine the flux reference components directly on the basis of the virtual flux of Equations 8a and 8b, a step change in the converter voltage vector may induce dc terms in flux components $\psi_x$ and $\psi_y$ in the stationary reference frame. This can be seen as a problem in a digital control system, since a risk of an overflow may be present in a numerical representation of the flux reference components. An origin of the dc term can be understood by considering Equations 8a and 8b when they are transformed into time (t) domain:

$$\psi_{cd}^n(t) = u_{cd}^n(t)\cos(n\omega t) + u_{cq}^n(t)\sin(n\omega t), \quad (9a)$$

$$\psi_{cq}^n(t) = -u_{cd}^n(t)\sin(n\omega t) + u_{cq}^n(t)\cos(n\omega t). \quad (9b)$$

If a rotating reference frame rotates at an angular frequency $n\omega$, sine and cosine terms at the angular frequency $n\omega$ in the rotating reference frame are seen as dc terms in the stationary reference frame. Therefore, it may be necessary to form the flux reference components in such a manner that dc terms of stationary reference frame flux reference components are minimized.

Since in the stationary reference frame the voltage is the derivative of the flux, a dc term of the virtual flux does not reflect on the voltage. As Equations 8a and 8b define transfer functions for determining the virtual flux in a rotating reference frame on the basis of a voltage, a solution for minimizing the dc term is to approximate a virtual flux component by using transfer functions which have frequency responses similar to those in Equations 8a and 8b, except at the angular frequency $n\omega$.

Voltages may, for instance, be transformed into fluxes by using transfer functions:

$$\Psi_{cd}^n(s) \approx \frac{s}{(n\omega)^2}U_{cd}^n(s) + \frac{1}{n\omega}U_{cq}^n(s), \quad (10a)$$

$$\Psi_{cq}^n(s) \approx \frac{-1}{n\omega}U_{cd}^n(s) + \frac{s}{(n\omega)^2}U_{cq}^n(s). \quad (10b)$$

The frequency responses of Equations 10a and 10b are similar to those of Equations 8a and 8b at frequencies below the angular frequency $n\omega$. However, the transfer functions still contain derivation terms which may cause problems in a discrete time control system implementation.

This can be solved by filtering the approximated virtual flux by using a low pass filter, the time constant of which is $\tau_n$:

$$\Psi_{cd}^n(s) \approx \frac{1}{(n\omega)^2}\frac{s}{\tau_n s + 1}U_{cd}^n(s) + \frac{1}{n\omega}\frac{1}{\tau_n s + 1}U_{cq}^n(s) \quad (11a)$$

$$\Psi_{cq}^n(s) \approx \frac{-1}{n\omega}\frac{1}{\tau_n s + 1}U_{cd}^n(s) + \frac{1}{(n\omega)^2}\frac{s}{\tau_n s + 1}U_{cq}^n(s). \quad (11b)$$

Another approach for removing a dc term is to calculate the flux reference by using a transfer function that introduces integration action but simultaneously removes the dc term from the output. Such a solution may be a combination of a high-pass filter and an integrator. A voltage reference component is first filtered using a high pass filter, and then a flux reference component is determined by integrating the filtered voltage reference component. However, it may be necessary to ensure that the filter does affect the frequency of the reference frame. For instance, if a voltage reference component is used to control a component at the fundamental frequency of the converter output, the filter should not affect the fundamental frequency. A simple implementation of the above method is to use a high-pass filter that is based on a first-order low-pass filter:

$$G(s) = 1 - \frac{1}{\tau s + 1} = \frac{\tau s}{\tau s + 1} \quad (12)$$

If Equation 10 is applied to calculation of a flux by integrating a voltage, a following equation may be formed:

$$\Psi^*(s) = \frac{\tau_n s}{\tau_n s + 1} \frac{1}{s} \underline{U}^*(s) = \frac{\tau_n}{\tau_n s + 1} \underline{U}^*(s). \quad (13)$$

$\psi^*$ is the flux reference vector in the stationary reference frame, and $\underline{U}^*$ is the voltage reference vector in the stationary reference frame. Equation 11 may be expressed in a reference frame rotating at an angular frequency $n\omega$ as follows:

$$\Psi^n_{cd}(s) = \frac{s\tau_n^2 + \tau_n}{s^2\tau_n^2 + s2\tau_n + 1 + (n\omega\tau_n)^2} U^n_{cd}(s) + \quad (14a)$$
$$\frac{n\omega\tau_n^2}{s^2\tau_n^2 + s2\tau_n + 1 + (n\omega\tau_n)^2} U^n_{cq}(s)$$

$$\Psi^n_{cd}(s) = \frac{-n\omega\tau_n^2}{s^2\tau_n^2 + s2\tau_n + 1 + (n\omega\tau_n)^2} U^n_{cd}(s) + \quad (14b)$$
$$\frac{s\tau_n^2 + \tau_n}{s^2\tau_n^2 + s2\tau_n + 1 + (n\omega\tau_n)^2} U^n_{cq}(s).$$

The resulting rotating frame flux reference vector components do not induce dc terms to the flux reference vector $\psi^*$ in the stationary frame. However, the time constant $\tau_n$ should be selected with care, since it may affect the response time and the magnitude of the dc term (which, in the stationary frame, corresponds with a component at the angular frequency $n\omega$).

Yet another possibility is to apply a higher order high-pass filter to the stationary frame approach. Also, a band-stop filter may be used for the rotating reference frame approach.

The arrangement may also include a filter between the converter and the load. For example, in FIG. 2, the converter 21 includes an output filter. As illustrated in FIG. 2, the arrangement may also include a transformer between the converter and the load.

From a voltage control point of view, the island grid current can be considered as a disturbance which has an effect on the voltage. If a feedback signal of the island grid voltage is measured on the load side of the filter and the transformer, the loading condition, i.e. load current $i_l$, may have an effect on the grid voltage.

Therefore, to compensate for the effect of the load current $i_l$, the method may, for instance, include forming voltage feedforward terms on the basis of the load current. As the load current may induce dc terms in the voltage reference components in their reference frames, the feedforward terms may, for instance, be formed as complements of a gain of a load current term of the filter at a frequency of interest. The feedforward terms may then be used to adjust the voltage reference components.

In FIG. 2, a load current compensation block 253 calculates a feedforward term $u_{ff}$. The feedforward term is added to the voltage reference $\underline{u}^*$.

In island mode, maintaining a voltage seen by the load at its reference and supply current specified by the load can be seen as an object of the method of the disclosure. However, in order to protect converter hardware, the converter may have to be able to limit the supplied current. In addition, the current limitation functionality may also be specified to be able to trigger network protection devices or blow fuses. For example, the magnitude of the converter current may be controlled to stay below a pre-defined limit even if the magnitude of the current tries to rise above the limit.

A simple method for limiting the current supplied to the load is to decrease the voltage produced by the converter. If a load can be assumed to be of passive type, a decrease in voltage will result in a reduction of power supplied to the load. Thus, the converter current can be limited. In the case of an active load, the voltage produced by the converter may be controlled on the basis of the direction of power between the converter and the load.

Figure 3:
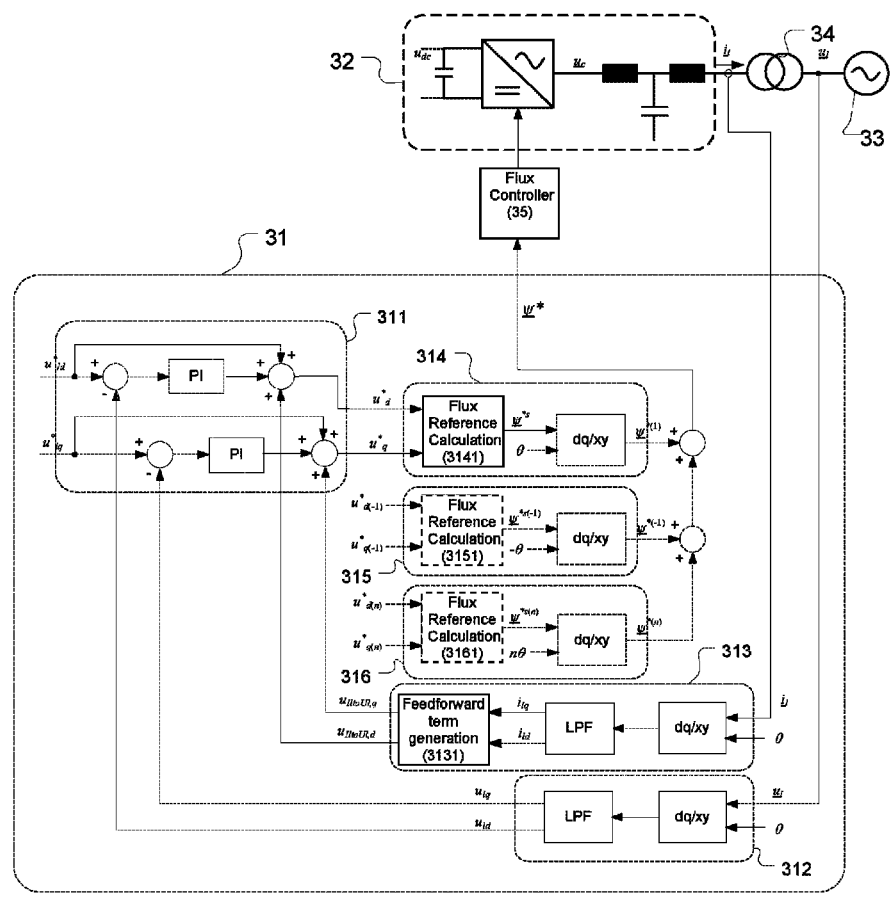
FIG. 3 illustrates an arrangement including an apparatus for controlling transfer of electrical power in the arrangement capable of operating in island mode in accordance with an exemplary embodiment of the present disclosure.

FIG. 3 illustrates an arrangement including an apparatus for controlling transfer of electrical power in the arrangement capable of operating in island mode in accordance with an exemplary embodiment of the present disclosure. FIG. 3 shows an arrangement including an apparatus 31 for controlling transfer of electrical power in island mode. The arrangement includes a converter 32 and a load 33 connected to the converter 32. In FIG. 3, the converter has an LCL filter at its output. As illustrated in FIG. 3, a transformer 34 may be placed between the converter 32 and the load 33. The converter 32 is controlled by a flux controller 35 which uses a flux reference $\psi^*$ as an input. The apparatus 31 determines the flux reference $\psi^*$.

The apparatus 31 includes a fundamental frequency controller 311 which determines a voltage reference $u^{*s}$ in a synchronous reference frame. The fundamental frequency controller 311 uses a load voltage reference $u_l^{*s}$ in the synchronous reference frame and a load voltage $u_l^s$ in the synchronous reference frame as inputs. The fundamental frequency controller 311 determines the voltage reference in a synchronous reference frame on the basis of a difference between the load voltage reference $u_l^{*s}$ and the load voltage $U_l^s$. The fundamental frequency controller 311 may, for instance, be based on a PI controller. In FIG. 3, the voltage reference $u^{*s}$, the load voltage reference $u_l^{*s}$, and the load voltage $u_l^s$ are represented by their d and q components.

The load voltage reference $u_l^{*s}$ provided by a higher level control algorithm not discussed in detail in this document. The load voltage is sensed on the load side of the transformer 33 and transformed into the synchronous reference frame by using a voltage sensor 312.

Since the feedback signal of the island grid voltage is measured on the load side of the transformer, the load current b may have an effect on the grid voltage. This can be seen in $$U_l(s) = \frac{1}{s^2 L_c C + 1} U_c(s) - \frac{s^3 L_l L_c C + s(L_l + L_c)}{s^2 L_c C + 1} I_l(s), \quad (15)$$

where the island grid voltage vector $U_l$ is written as a function of the converter voltage vector $U_c$ and island grid current vector $I_l$. In the previous equation, the line side reactor of the LCL filter can be considered to contain also the leakage inductance of the transformer. In the synchronous reference frame this is $$U_l^s(s) = \frac{1}{s^2 L_c C + js2\omega L_c C - \omega^2 L_c C + 1} U_c^s(s) - \frac{s^3 L_l L_c C + js^2 3\omega L_l L_c C - s3\omega^2 L_l L_c C + s(L_l + L_c)}{s^2 L_c C + js2\omega L_c C - \omega^2 L_c C + 1} I_l^s(s) - \frac{-j\omega^3 L_l L_c C + j\omega(L_l + L_c)}{s^2 L_c C + js2\omega L_c C - \omega^2 L_c C + 1} I_l^s(s). \quad (16)$$

In order to compensate for the effect of the load current, the apparatus 31 includes a current sensor 313. The current sensor transforms the current into the synchronous reference frame. In FIG. 3, the load current $i_l^s$ in the synchronous reference frame is represented in its component form. The current sensor 313 also includes a feedforward term generation block 3131 which forms a voltage feedforward term $U_{IltoUl}^s$ which is a complement of a dc gain of a load current term in Equation 16:

$$U_{IltoUl}^s(s) = \frac{j\omega(-\omega^2 L_l L_c C + L_l + L_c)}{-\omega^2 L_c C + 1} I_l^s(s). \quad (17)$$

In component form, the feedforward term $U_{IltoUl}^s$ is $$U_{IltoUl,d}(s) = \frac{\omega(-\omega^2 L_l L_c C + L_l + L_c)}{\omega^2 L_c C - 1} I_{lq}(s) \quad (18a)$$

$$U_{IltoUl,q}(s) = \frac{\omega(\omega^2 L_l L_c C - L_l - L_c)}{\omega^2 L_c C - 1} I_{ld}(s). \quad (18b)$$

The feedforward term calculated using Equations 18a and 18b may be added to the fundamental voltage reference component calculated by the fundamental frequency controller 311.

A sum of the fundamental voltage reference component and the feedforward term is used as an input for a flux reference generator 314. The flux reference generator 314 determines the fundamental flux reference component in a stationary reference frame on the basis of the sum of the fundamental voltage reference component and the feedforward term, using a transfer function which removes a dc term of the fundamental flux reference component in the stationary reference frame.

The flux reference generator 314 may, for instance, includes a flux reference calculation block 3141 which approximates the flux reference by using transfer functions which have the same dc gains as Equations 8a and 8b, and filters the approximated flux reference by using a low-pass filter. That is, removal of the dc term may be based on Equations 11a and 11b.

To transform the above flux reference term into the synchronous reference frame produce by the flux reference calculation block 3141, the flux reference generator 314 also includes a reference frame transformation block.

FIG. 3 illustrates a complete control system only for the fundamental frequency voltage. Other (negative and positive sequence) harmonic components can be compensated for in a similar manner. FIG. 3 illustrates flux reference generators 315 and 316 for a fundamental negative sequence component and an nth harmonic component, respectively. Indexes in brackets in signal names of the generators indicate orders of harmonics in question. The flux reference generators 315 and 316 may be similar to the fundamental frequency flux reference generator 314.

For instance, the flux reference generators 315 and 316 may, as in FIG. 3, include flux reference calculation blocks 3151 and 3161, and use voltage references as inputs. The flux reference calculation blocks 3151 and 3161 may operate on different rotating reference frames. The voltage reference components may be produced by controllers which may be similar to the fundamental frequency controller but, for instance, have their voltage references set to zero. In FIG. 3, the flux reference term for the fundamental frequency negative sequence component is represented in its vector form $\psi^{*s(-1)}$. The index −1 in brackets represents the order of the harmonic. In FIG. 3, the flux reference term for the nth order harmonic component is represented in its vector form $\psi^{*s(n)}$.

Instead of using Equations 11a and 11b, the generation of the flux reference terms may, for instance, be carried out based on Equations 14a and 14b. Flux reference calculation blocks 3141, 3151, and 3161 may first filter their voltage reference components by using high-pass filters, and then determine flux reference components by integrating the filtered voltage reference components.

The calculated flux reference components in their rotating reference frames are then transformed into the stationary reference frame. Finally, the flux reference terms in the stationary reference frame are added together, and the resulting flux reference is fed to the flux controller 35. By using the flux controller 35, the converter 31 is controlled for producing a voltage vector corresponding to the control reference on the basis of the flux reference.

Figure 4:
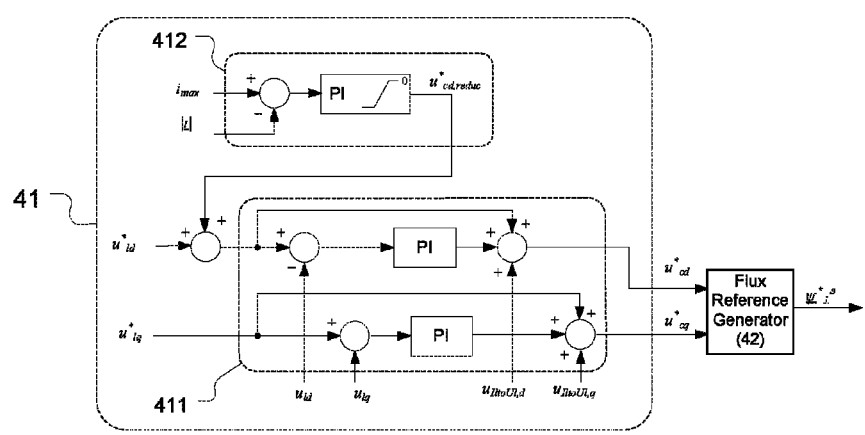
FIG. 4 illustrates a fundamental frequency voltage controller with an ability to limit an output current in accordance with an exemplary embodiment of the present disclosure.

FIG. 4 illustrates a fundamental frequency voltage controller with an ability to limit an output current in accordance with an exemplary embodiment of the present disclosure. FIG. 4 shows a controller 41 with an ability to limit the supplied current. The controller 41 includes a fundamental frequency voltage controller 411 and a current limiting controller 412. The fundamental frequency voltage controller 411 may be similar to the controller 311 of FIG. 3. The controller 41 of FIG. 4 may be used to replace the controller 311 of FIG. 3.

An output $u^*_{ld, reduc}$ of the current limiting controller 412 decreases a d-axis component $u^*_{ld}$ of a fundamental frequency voltage reference $u_l^*$. A maximum output value for the current limiting controller 412 is limited to zero. Thus, if a set current limit $i_{max}$ (defined, for instance, by the user) is greater than a magnitude $|i|$ of the converter current vector, the voltage controller 411 input is affected only by the fundamental frequency voltage reference $u_l^*$. However, if the magnitude $|i|$ of the converter current vector tries to rise above the limit $i_{max}$, the current limiting controller 412 controls the magnitude of the fundamental frequency voltage.

When the load is a passive load, the current limiting controller 412 reduces the magnitude of the fundamental frequency voltage when the magnitude $|i|$ of the converter current vector tries to rise above the limit $i_{max}$. Also active loads may be used, if the direction of a power flow between the converter and the load is first determined. On the basis of the direction, the magnitude of the fundamental frequency voltage can be either reduced or increased in order to reduce the magnitude |i| of the converter current vector. In this manner, the magnitude |i| of a converter current vector can be maintained under the set limit $i_{max}$.

The output of the controller 41 is fed to a flux reference generator 42, in a manner similar to that used in the arrangement of FIG. 3.

The methods and related apparatuses have been described above with reference to the respective functions they perform according to exemplary embodiments. It is to be understood that one or more of these elements and functions can be implemented in a hardware configuration. For example, the respective components can include a computer processor configured to execute computer-readable instructions (e.g. computer-readable software), a non-volatile computer-readable recording medium, such as a memory element (e.g. ROM, flash memory, optical memory, etc.) configured to store such computer-readable instructions, and a volatile computer-readable recording medium (e.g. RAM) configured to be utilized by the computer processor as working memory while executing the computer-readable instructions. The methods and the related apparatuses may also be configured to sense, generate and/or operate in accordance with analog signals, digital signals and/or a combination of digital and analog signals to carry out their intended functions.

It will be obvious to a person skilled in the art that the inventive concept can be implemented in various ways. The disclosure and its embodiments are not limited to the examples described above but may vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for controlling transfer of electrical power in island mode in an arrangement including a converter and a load connected to the converter, the method comprising:

determining voltage reference components for one or more frequency components of an output voltage of the converter, wherein the frequency components represent at least one of a positive sequence component, a negative sequence component, or harmonic components;

compensating for an effect of a load current by forming one or more voltage feedforward terms based on the load current and using the feedforward terms to adjust the voltage reference components;

filtering the voltage reference components using a high-pass filter;

forming flux reference components for one or more of the frequency components by integrating the filtered voltage reference components;

forming a flux reference based on the flux reference components; and controlling the output voltage of the converter based on the flux reference using a flux controller.

2. The method according to claim 1, wherein determining the voltage reference components comprises:

determining a load voltage reference;

determining a load voltage; and determining a voltage reference component based on a difference between the load voltage reference and the load voltage.

3. The method according to claim 1, wherein the load is connected to the converter through a filter, and wherein the method comprises:

forming one or more voltage feedforward terms, wherein each term is a complement of a gain of a load current term of the filter at a predefined frequency, and adding the feedforward terms to the voltage reference components.

4. The method according to claim 1, wherein one or more negative sequence components of the output voltage are compensated for.

5. The method according to claim 1, wherein one or more harmonic components of the output voltage are compensated for.

6. The method according to claim 1, wherein the method comprises:

controlling a magnitude of a fundamental frequency voltage if the magnitude (|i|) of a converter current vector tries to rise above a set limit ($i_{max}$), wherein the controlling is carried out such that the magnitude (|i|) of a converter current vector is maintained under the set limit.

7. The method according to claim 1, wherein at least one component or term of the voltage reference components, the voltage feedforward terms, and the flux reference components is formed in a rotating reference frame.

8. The method according to claim 1, wherein the voltage reference components are determined in a rotating reference frame, the voltage feedforward terms are formed in rotating reference frames, and the forming flux reference components are formed in rotating reference frames.

9. The method according to claim 1, wherein at least one component or term of the voltage reference components, the voltage feedforward terms, and the flux reference components is formed in a stationary reference frame.

10. An apparatus for controlling transfer of electrical power in island mode in an arrangement including a converter and a load connected to the converter through a filter, the apparatus comprising:

means for determining voltage reference components for one or more frequency components of an output voltage of the converter, wherein the frequency components represent components such as a positive sequence component, a negative sequence component or harmonic components;

means for compensating for an effect of a load current by forming one or more voltage feedforward terms based on the load current and using the feedforward terms to adjust the voltage reference components;

means for filtering the voltage reference components using a high-pass filter;

means for forming flux reference components for one or more of the frequency components by integrating the filtered voltage reference components;

means for forming a flux reference based on the flux reference components; and a flux controller for controlling the output voltage of the converter based on the flux reference.

11. The apparatus of claim 10, comprising:
  means for forming one or more voltage feedforward terms, wherein each term is a complement of a gain of a load current term of the filter at a predefined frequency, and
  means for adding the feedforward terms to the voltage reference components.

12. A non-transitory computer-readable medium storing computer-readable instructions for a method of controlling transfer of electrical power in island mode in an arrangement including a converter and a load connected to the converter through a filter, which when in communicable contact with a processor causes the processor to execute the method comprising:
  determining voltage reference components for one or more frequency components of an output voltage of the converter, wherein the frequency components represent at least one of a positive sequence component, a negative sequence component, or harmonic components;
  compensating for an effect of a load current by forming one or more voltage feedforward terms based on the load current and using the feedforward terms to adjust the voltage reference components;
  filtering the voltage reference components using a high-pass filter;
  forming flux reference components for one or more of the frequency components by integrating the filtered voltage reference components;
  forming a flux reference based on the flux reference components; and
  controlling the output voltage of the converter based on the flux reference using a flux controller.

13. The computer readable medium of claim 12, wherein determining the voltage reference components comprises:
  determining a load voltage reference;
  determining a load voltage; and
  determining a voltage reference component based on a difference between the load voltage reference and the load voltage.

* * * * *